US012772266B2

(12) United States Patent
Krishnakumar et al.

(10) Patent No.: US 12,772,266 B2
(45) Date of Patent: Oct. 20, 2026

(54) OPTIMIZED SYSTEM INFORMATION TRANSMISSION ON ONE OR MORE DETECTABLE BEAMS

(71) Applicant: Nokia Technologies Oy, Espoo (FI)

(72) Inventors: Kamakshi Lakshminarayanapuram Krishnakumar, Espoo (FI); Navin Hathiramani, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 321 days.

(21) Appl. No.: 18/408,249

(22) Filed: Jan. 9, 2024

(65) Prior Publication Data

US 2024/0244644 A1 Jul. 18, 2024

Related U.S. Application Data

(60) Provisional application No. 63/438,858, filed on Jan. 13, 2023.

(51) Int. Cl.
*H04W 72/30* (2023.01)
*H04W 16/28* (2009.01)
*H04W 72/044* (2023.01)
*H04W 72/232* (2023.01)

(52) U.S. Cl.
CPC ........... *H04W 72/30* (2023.01); *H04W 16/28* (2013.01); *H04W 72/046* (2013.01); *H04W 72/232* (2023.01)

(58) Field of Classification Search
CPC ... H04W 72/30; H04W 72/232; H04W 16/28; H04W 74/046; H04W 28/16; H04W 48/12; H04W 48/16; H04B 7/06952; H04B 7/088; H04B 7/0695
See application file for complete search history.

(56) References Cited

U.S. PATENT DOCUMENTS

2019/0253124 A1* 8/2019 Awada ................. H04B 7/0695
2022/0069868 A1* 3/2022 Abedini ................. H04B 7/043
2022/0094431 A1* 3/2022 Kaen ......................... H04B 7/19
2022/0103980 A1* 3/2022 Jaquish ................. G06F 21/606

OTHER PUBLICATIONS

"Further Discussion on Other SI" Spokane, USA; Jan. 17-19, 2017 (Year: 2017).*
"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

(Continued)

*Primary Examiner* — Mewale A Ambaye
(74) *Attorney, Agent, or Firm* — Nokia Technologies Oy

(57) ABSTRACT

A method may include receiving on a selected beam information related to decoding a required system information at least on one or more other beams. The method may also include determining that a required system information is not broadcast on the selected beam. The method may further include receiving the required system information on one or more other detectable beams according to the information related to decoding the required system information.

18 Claims, 12 Drawing Sheets

(56) References Cited

OTHER PUBLICATIONS

"3rd Generation Partnership Project; Technical Specification Group Radio Access Network; NR; Physical layer procedures for control (Release 17)", 3GPP TS 38.213, V17.3.0, Sep. 2022, pp. 1-260.

"3rd Generation Partnership Project; Technical Specification Group Radio Access Network; NR; User Equipment (UE) procedures in Idle mode and RRC Inactive state (Release 17)", 3GPP TS 38.304, V17.2.0, Sep. 2022, pp. 1-50.

"3rd Generation Partnership Project, Technical Specification Group Radio Access Network; Study on network energy savings for NR (Release 18)", 3GPP TR 38.864, V1.0.0, Dec. 2022, pp. 1-71.

* cited by examiner

```
SIB1 IE:
* OSIschedulingInfo ::= SEQUENCE {
        * OSI-BroadcastStatus ENUMERATED (broadcasting, notBroadcasting),
        * beamIndex INTEGER (1..64)
        * ....
* }
```

OPTIMIZED SYSTEM INFORMATION TRANSMISSION ON ONE OR MORE DETECTABLE BEAMS

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for optimized system information transmission.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, and/or fifth generation (5G) radio access technology or NR access technology. 5G wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include receiving on a selected beam information related to decoding a required system information at least on one or more other beams. The method may also include determining that a required system information is not broadcast on the selected beam. The method may further include receiving the required system information on one or more other detectable beams according to the information related to decoding the required system information.

Other example embodiments may be directed to an apparatus. The apparatus may include at least one processor and at least one memory including computer program code. The at least one memory and computer program code may also be configured to, with the at least one processor, cause the apparatus at least to receive on a selected beam information related to decoding a required system information at least on one or more other beams. The apparatus may also be caused to determine that a required system information is not broadcast on the selected beam. The apparatus may further be caused to receive the required system information on one or more other detectable beams according to the information related to decoding the required system information.

Other example embodiments may be directed to an apparatus. The apparatus may include means for receiving on a selected beam information related to decoding a required system information at least on one or more other. The apparatus may also include means for determining that a required system information is not broadcast on the selected beam. The apparatus may further include means for receiving the required system information on one or more other detectable beams according to the information related to decoding the required system information.

In accordance with other example embodiments, a non-transitory computer readable medium may be encoded with instructions that may when executed in hardware, perform a method. The method may include receiving on a selected beam information related to decoding a required system information at least on one or more other beams. The method may also include determining that a required system information is not broadcast on the selected beam. The method may further include receiving the required system information on one or more other detectable beams according to the information related to decoding the required system information.

Other example embodiments may be directed to a computer program product that performs a method. The method may include receiving on a selected beam information related to decoding a required system information at least on one or more other beams. The method may also include determining that a required system information is not broadcast on the selected beam. The method may further include receiving the required system information on one or more other detectable beams according to the information related to decoding the required system information.

Other example embodiments may be directed to an apparatus that may include circuitry configured to receive on a selected beam information related to decoding a required system information at least on one or more other beams. The apparatus may also include circuitry configured to determine that a required system information is not broadcast on the selected beam. The apparatus may further include circuitry configured to receive the required system information on one or more other detectable beams according to the information related to decoding the required system information.

Some example embodiments may be directed to a method. The method may include determining to transmit a subset of system information messages to a user equipment on a subset of selected beams. The method may also include transmitting information related to decoding a system information on at least one beam in the subset of selected beams.

Other example embodiments may be directed to an apparatus. The apparatus may include at least one processor and at least one memory including computer program code. The at least one memory and computer program code may also be configured to, with the at least one processor, cause the apparatus at least to determine to transmit a subset of system information messages to a user equipment on a subset of selected beams. The apparatus may also be caused to transmit information related to decoding a system information on at least one beam in the subset of selected beams.

Other example embodiments may be directed to an apparatus. The apparatus may include means for determining to transmit a subset of system information messages to a user equipment on a subset of selected beams. The apparatus may also include means for transmitting information related to decoding a system information on at least one beam in the subset of selected beams.

In accordance with other example embodiments, a non-transitory computer readable medium may be encoded with instructions that may when executed in hardware, perform a method. The method may include determining to transmit a subset of system information messages to a user equipment on a subset of selected beams. The method may also include transmitting information related to decoding a system information on at least one beam in the subset of selected beams.

Other example embodiments may be directed to a computer program product that performs a method. The method may include determining to transmit a subset of system information messages to a user equipment on a subset of selected beams. The method may also include transmitting information related to decoding a system information on at least one beam in the subset of selected beams.

Other example embodiments may be directed to an apparatus that may include circuitry configured to determine to transmit a subset of system information messages to a user equipment on a subset of selected beams. The apparatus may also include circuitry configured to transmit information related to decoding a system information on at least one beam in the subset of selected beams.

BRIEF DESCRIPTION OF THE DRAWINGS

For proper understanding of example embodiments, reference should be made to the accompanying drawings, wherein:

FIG. 3(*b*) illustrates another example transmission of information related to OSI, according to certain example embodiments.

FIG. 3(*c*) illustrates a further example transmission of information related to OSI, according to certain example embodiments.

FIG. 4(*b*) illustrates an example of another signal diagram between the UE and the BS, according to certain example embodiments.

DETAILED DESCRIPTION

Figure 1:
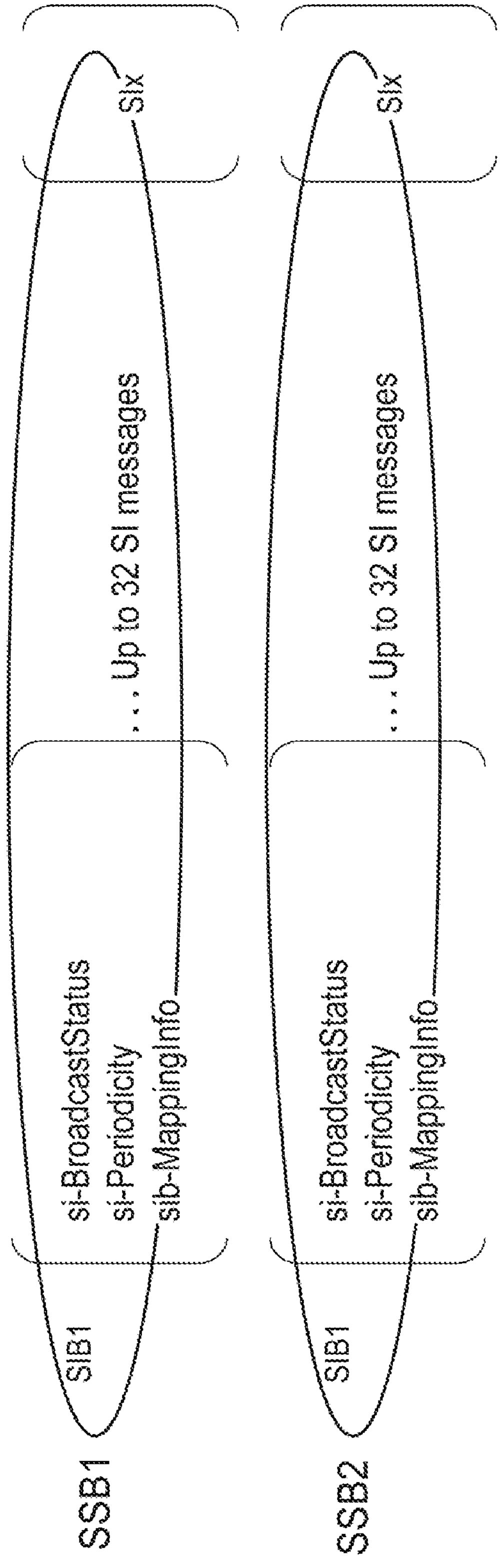
FIG. 1 illustrates an example radio resource control (RRC) configuration for other system information (OSI) messages.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for optimized system information transmission. For instance, certain example embodiments may be directed to optimized system information-transmission for energy efficiency.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably. Additionally, the terms broadcast, transmit, or other similar language, throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

When considering the total cost of operating a network, most expenses for mobile network operators may be attributed to network energy consumption by the radio access network (RAN). As such, network energy saving may be useful for environmental sustainability to reduce harmful environmental impact (e.g., greenhouse gas emissions), and for operation cost savings. As 5G becomes widespread across industries and geographical areas, handling more advanced services and applications requiring high data rates (e.g., extended reality (XR)). Additionally, networks are becoming denser, use more antennas, have larger bandwidths, and have more frequency bands. Thus, the negative environmental impact of 5G needs to stay under control, and it may be desirable to provide solutions to improve network energy savings to address such issues.

Energy consumption has become a part of an operators' operating expense (OPEX). For instance, the energy cost on mobile networks may account for approximately 23% of the total operator cost. Most of the energy consumption may stem from the RAN, and in particular, from active array units (AAU), with data centers and fiber transport accounting for a smaller share of energy consumption. The power consumption of a radio access may be split into two parts including, for example, a dynamic part that is consumed when data transmission/reception is ongoing, and a static part which is consumed all the time to maintain the necessary operation of the radio access devices, even when the data transmission/reception is not on-going.

For other system information (OSI) messages, the system information (SI) messages may be broadcasted or transmitted on-demand. Thus, there is some be flexibility to configure the status for each SI message (broadcast/on-demand), however, energy savings from on-demand SI may be questionable.

FIG. 1 illustrates an example radio resource control (RRC) configuration for OSI messages. As illustrated in FIG. 1, two synchronization signal block (SSB) beams may be considered, and each SSB beam may transmit the same cell specific system information block type 1 (SIB1) content. The SIB1 may carry scheduling information for other system information blocks (SIBs), and FIG. 1 illustrates the scheduling parameters such as si-BroadcastStatus, si-MappingInfo, and si-Periodicity per SI message.

In beam-based cells, not all beams are equal. Instead, the beams may all have different coverage areas and handle different density of users. Thus, it may be possible to optimize, at the beam level, transmission of OSI. Efficiently transmitting the OSI on beams only where and when they are needed may enable NW energy savings.

When new features are introduced in certain Rel-x that contain any new SI message, the broadcast of this SI message on all beams may not be efficient considering the number of user equipments (UEs) with the Rel-x capability would be low. From this perspective, the current SI broadcast/on-demand transmission may need enhancement to address such deficiencies. Additionally, current specifications do not provide any discussion on the granularity on a beam level of OSI information, and do not discuss how a UE may acquire the granularity on the beam level of OSI information. Instead, current specifications focus mainly on scenarios of cells with low load for energy savings, where certain example embodiments described herein may address low cell load scenarios.

Certain example embodiments may define a mechanism that is capable of providing efficient transmission of OSI messages. For instance, to enable this framework, each beam of a serving cell may indicate to the UE whether OSI is transmitted on the beam, and optionally on which beams the OSI is transmitted. In other example embodiments, the UE may acquire OSI from a non-best serving cell beam if it is not broadcasted on its best beam. Otherwise, the UE may initiate an on-demand procedure for OSI on the best beam of the UE (e.g., strongest downlink (DL) beam that the UE is able to scan), and the gNB may determine on which subset of beams (i.e., at least including the beam on which it was requested) to broadcast the OSI on.

Figure 2:
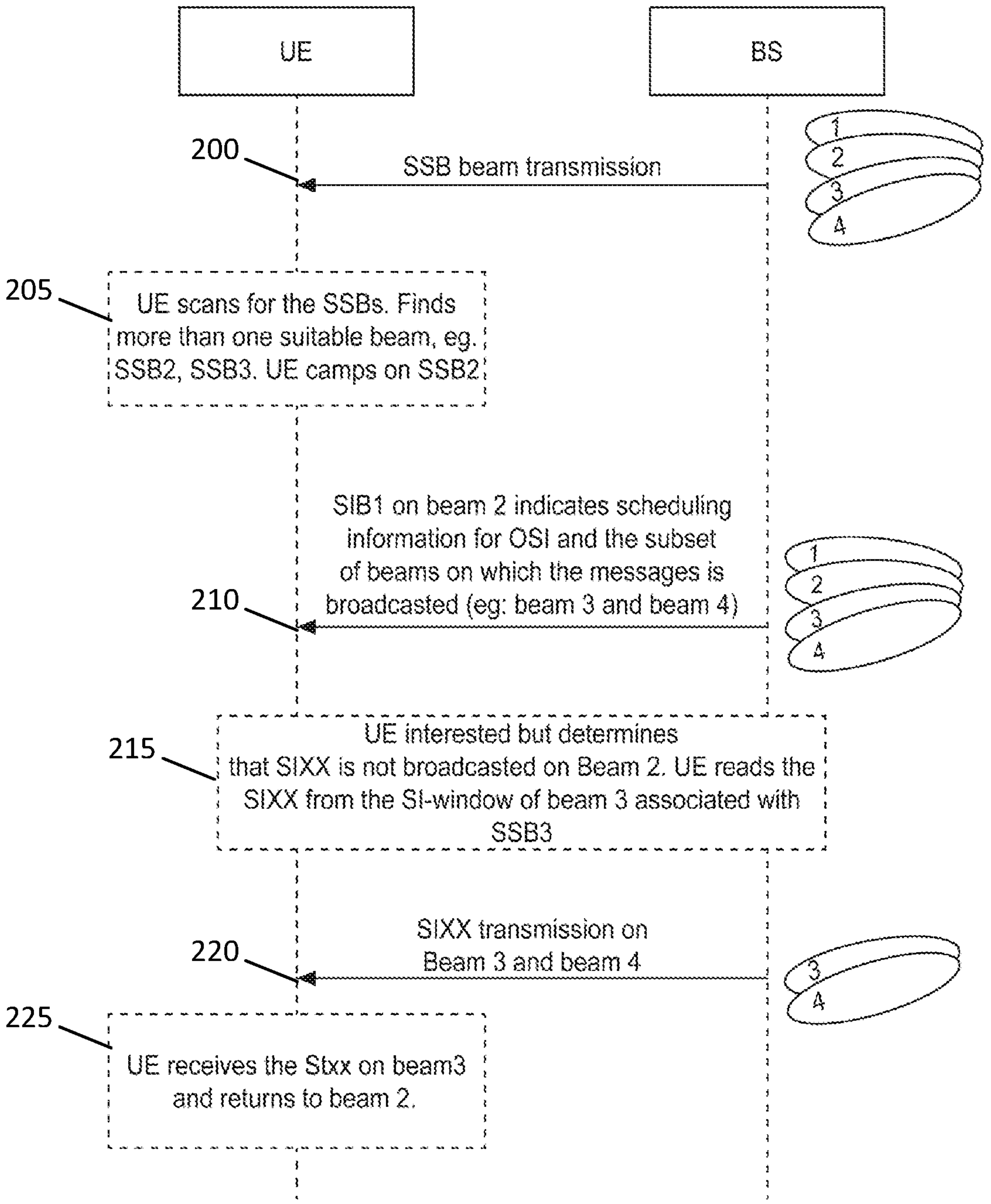
FIG. 2 illustrates an example signal flow diagram, according to certain example embodiments.

FIG. 2 illustrates an example signal flow diagram, according to certain example embodiments. As illustrated in FIG. 2, at 200, the BS (i.e., gNB/serving cell) may perform a SSB beam transmission. In other example embodiments, the BS may determine to transmit OSI on certain beams (i.e., on multiple beams that form a subset of the total number of SSB beams transmitted by the gNB) within a subset of beams such as, for example, for energy savings based on data of active users and random access channel (RACH) load per beam. At 205, the UE may scan for the SSBs and find more than one suitable/best beam (e.g., SSB2, SSB3). Once the UE has found a suitable/best beam (e.g., SSB2), the UE may camp on the suitable/best beam following a cell (re)selection criterion. In certain example embodiments, a suitable/best beam may correspond to the best beam according to a beam measurement by the UE. Additionally, the cell (re)selection procedure may allow the UE to select a suitable cell to camp on it as described in the technical specifications of the Third Generation Partnership Project (3GPP) 38.304. Further, the UE may perform beam measurements as per the measurement rules and the selection criteria broadcasted in SIB1. At 210, the BS may transmit on a per beam basis, SIB1 and an indication of whether OSI is transmitted. For example, as illustrated in FIG. 2, the BS may transmit SIB1 on beam 2, which may indicate scheduling information for OSI, and may indicate the subset of beams on which the message is transmitted (e.g., beam 3 and beam 4). In other words, the indication may also identify on which beam(s) OSI is transmitted. According to some example embodiments, the indication may be transmitted via a SIB1 information element (IE), a medium access control-control element (MAC-CE) bitmap, or a downlink control information (DCI) indication. According to other example embodiments, for DCI, the indication may include 1 bit to indicate if OSI is transmitted or not transmitted in the current beam without information on other beams.

As further illustrated in FIG. 2, at 215, the UE may express interest in, but determine that SIXX is not transmitted on beam 2. SIXX may be a particular SI message where XX refers to the order of the entry in the list of SI messages. After determining that SIXX is not transmitted on beam 2, the UE may read the SIXX from the SI-window of beam 3 associated with SSB3. At 220, the BS may perform SIXX transmission on beam 3 and beam 4, and at 225, the UE may receive the SIXX on beam 3, and retune to beam 2.

With regard to FIG. 2, in certain example embodiments, the UE may check for the validity of stored SI for the cell and particular beam (i.e., suitable/best beam). The UE may also initiate SI acquisition for any missing beam information (i.e., OSI). In other example embodiments, the UE may decode the SIB1 and determine, based on an indication, if on its current beam, OSI was transmitted. If so, the UE may acquire the OSI. However, if the OSI was not transmitted on the current beam of the UE, the UE may determine if the OSI is transmitted on another beam that is detectable by the UE. If the OSI is determined to be transmitted in another beam, the UE may switch to that beam for OSI decoding. On the other hand, if the UE determines that the OSI is not to transmitted on any other beam that the UE can decode, the UE may initiate an on-demand OSI request for transmission of the OSI to transmit a request to the BS for the OSI. In other example embodiments, the UE may store the OSI per beam broadcast status for future attempts in decoding OSI until SIB1 is acquired.

According to certain example embodiments, once the BS receives the on-demand request from the UE, the BS may broadcast the OSI on a subset of beams including the one in which it was demanded by the UE. According to other example embodiments, the BS may determine the subset of beams based on the UE beam request for OSI. In certain example embodiments, the determination of the subset of beams may be done based on the beam on which the OSI request was received and the neighboring beams which do not have OSI broadcasted, and between which there are known mobility patterns.

In 3GPP, NR may support beam-based transmission, and SSBs and SIB1s may be transmitted on multiple beams to cover a cell area. The SIB1 may be a cell-specific message, and it may carry the scheduling and availability information about other SIBs. For instance, the scheduling and availability information may include the SIBs to SI mapping, periodicity, and the broadcasting status. Additionally, the UE may read the SSB beams and decide to camp on the strongest SSB beam, and the UE may store the SIB1 broadcasted. For OSI transmissions, the UE may look for the physical downlink control channel (PDCCH) monitoring occasion within the SI window of the corresponding beam. If the SI is not broadcasted, the UE may transmit an on-demand request using RACH resources indicated for the SI message reception.

In certain example embodiments, the BS may be able to transmit the SI message in a subset of beams, and indicate to the UEs the list of beams on which the SI messages shall be available. The UE may also be able to monitor the PDCCH occasions in the SI-window of any of the suitable beams, and acquire the SI message.

Figure 3A:
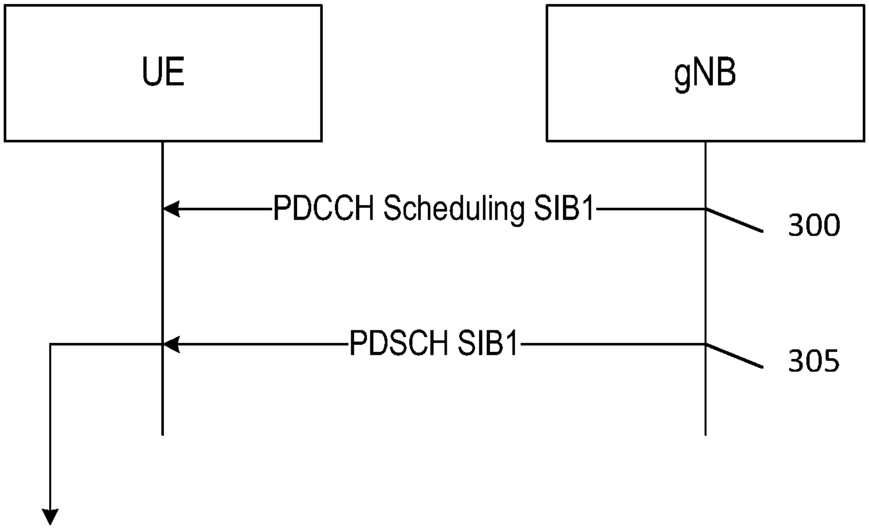
FIG. 3(*a*) illustrates an example transmission of information related to OSI, according to certain example embodiments.
Figure 3B:
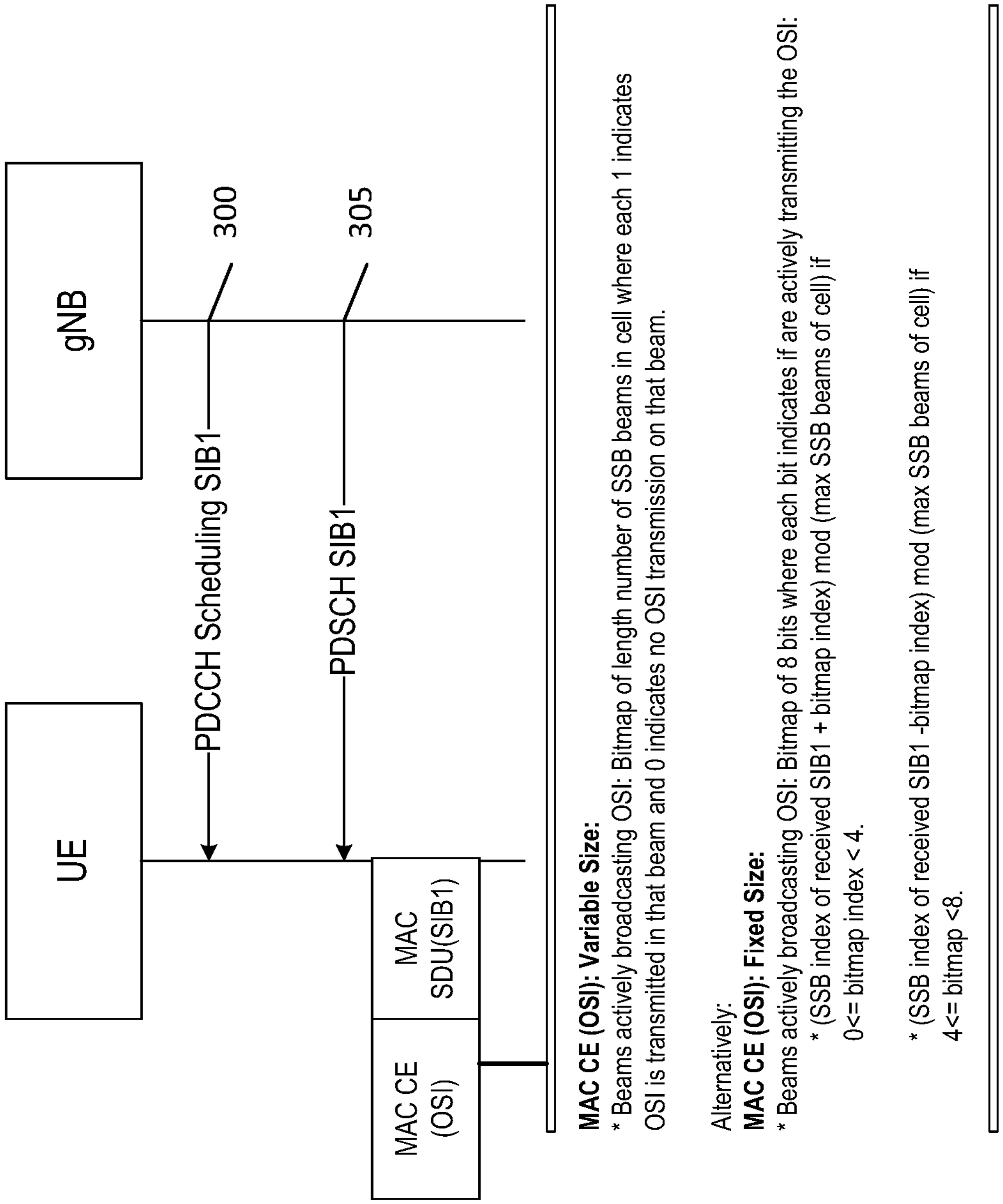
Figure 3C:
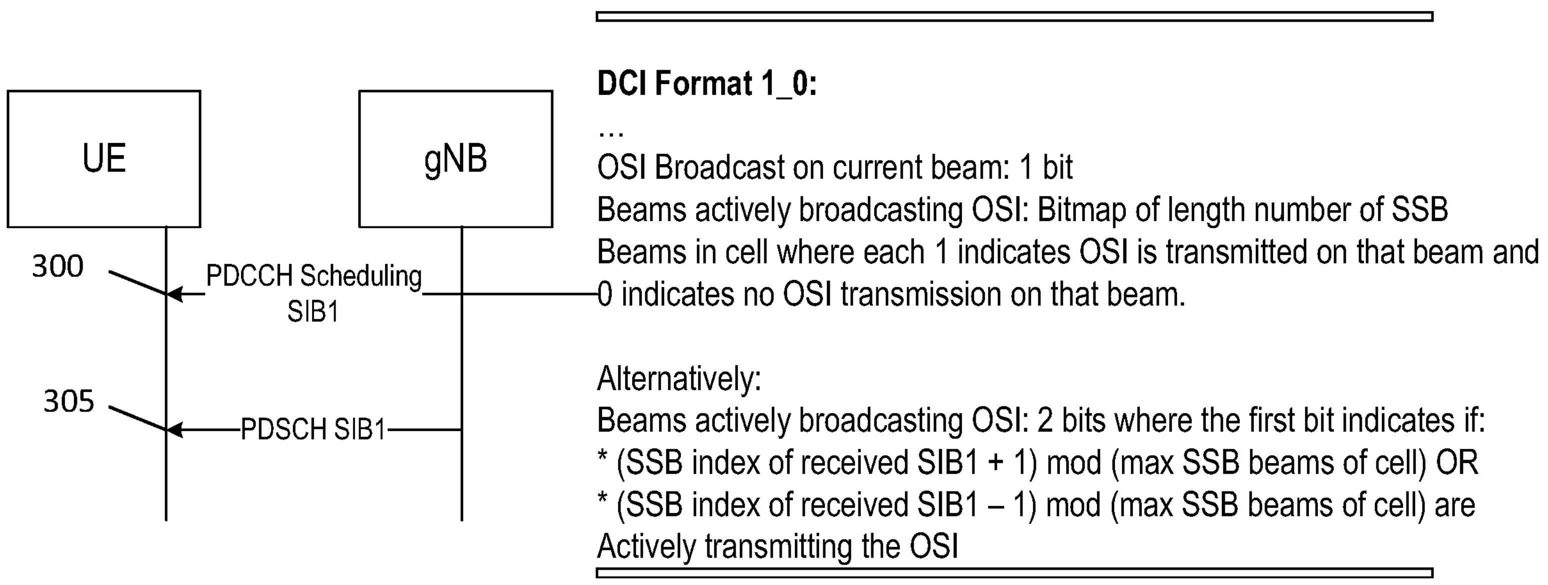

FIG. 3(*a*) illustrates an example transmission of information related to OSI, according to certain example embodiments. For instance, in some example embodiments, the information may correspond to information of at least whether OSI is transmitted on a specific beam. The information may be transmitted via an information element (IE) in SIB1. At 300, the gNB may transmit scheduling SIB1 via a physical downlink control channel (PDCCH). At 305, the gNB may also transmit SIB1 via a physical downlink shared channel (PDSCH).

According to certain example embodiments, a new IE providing the information on, for example, which subset of beams actively transmit the OSI may be included as part of SIB1. As illustrated in FIG. 3(*a*), in some example embodiments, the information may include OSIschedulingInfo::=SEQUENCE {Osi-BroadcastStatus ENUMERATED {broadcasting, notBroadcasting}, beamIndex INTEGER (1.64).

FIG. 3(*b*) illustrates another example transmission of information related to OSI, according to certain example embodiments. For instance, in certain example embodiments, the information may be transmitted via MAC-CE transmitted jointly with SIB1. Similar to FIG. 3(*a*), at 300, the gNB may transmit scheduling SIB1 via PDCCH. At 305, the gNB may also transmit SIB1 via a PDSCH.

In the transmission illustrated in FIG. 3(*b*), a MAC-CE may be included in the header of the SIB1 transmission to accommodate the information on the active transmission of the OSI of the current beam and other beams. IN some example embodiments, a variable size MAC-CE may be defined as MAC-CE (OSI) variable size where beams are actively broadcasting OSI. With regard to beams actively broadcasting OSI, a bitmap of length number of SSB beams in the cell where each 1 indicates OSI may be transmitted in that beam, and 0 indicates no OSI transmission on that beam.

Alternatively, in other example embodiments, a fixed size MAC-CE may be employed to reduce MAC-CE overheads. In this case, the gNB may inform about OSI broadcast status of neighboring beams to the one broadcasted. For instance, the MAC-CE (OSI) may be of fixed size. Additionally, beams actively broadcasting OSI may include a bitmap of 8 bits where each bit indicates if they are actively the OSI. For instance, (SSB index of received SIB1+bitmap index) mod (max SSB beams of cell) if 0<=bitmap index<4. Alternatively or in addition to the above, (SSB index of received SIB1−bitmap index) mod (max SSB beams of cell) if 4<=bitmap index<8.

FIG. 3(*c*) illustrates a further example transmission of information related to OSI, according to certain example embodiments. For instance, in certain example embodiments, the information may be transmitted via DCI employed to schedule the SIB1. Similar to FIG. 3(*a*), at 300, the gNB may transmit scheduling SIB1 via PDCCH. At 305, the gNB may also transmit SIB1 via PDSCH.

As illustrated in FIG. 3(*c*), the DCI employed to schedule the SIB1 may include extra bits to accommodate the information on the active transmission of the OSI of the current beam and other beams. In some example embodiments, only information on whether the OSI is transmitted on the current beam may be transmitted. In other example embodiments, a larger number of bits may be employed to inform the UE on which beams or neighboring beams the OSI may be transmitted.

Figure 4A:
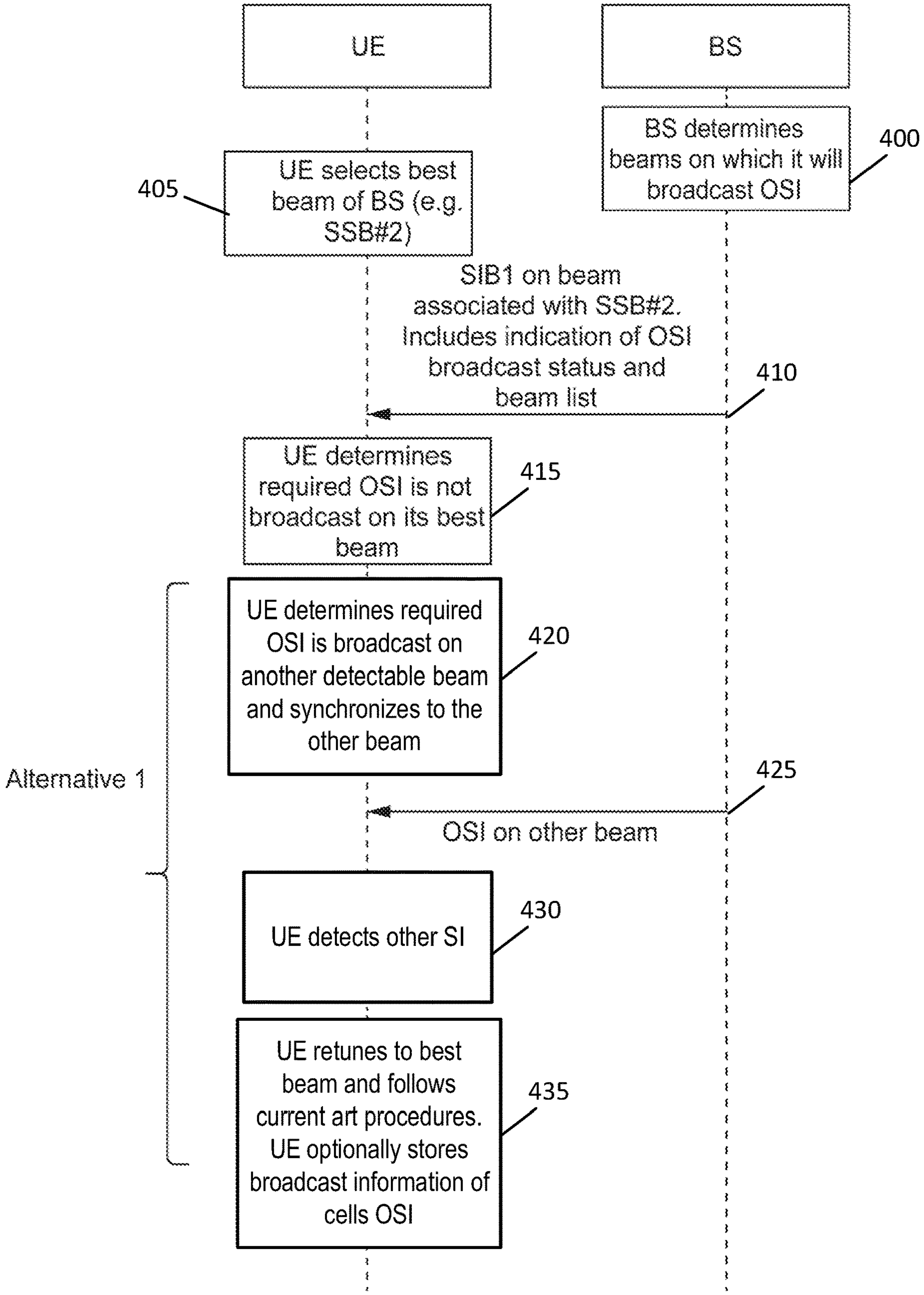
FIG. 4(*a*) illustrates an example signal diagram between a user equipment (UE) and a base station (BS), according to certain example embodiments.
Figure 4B:
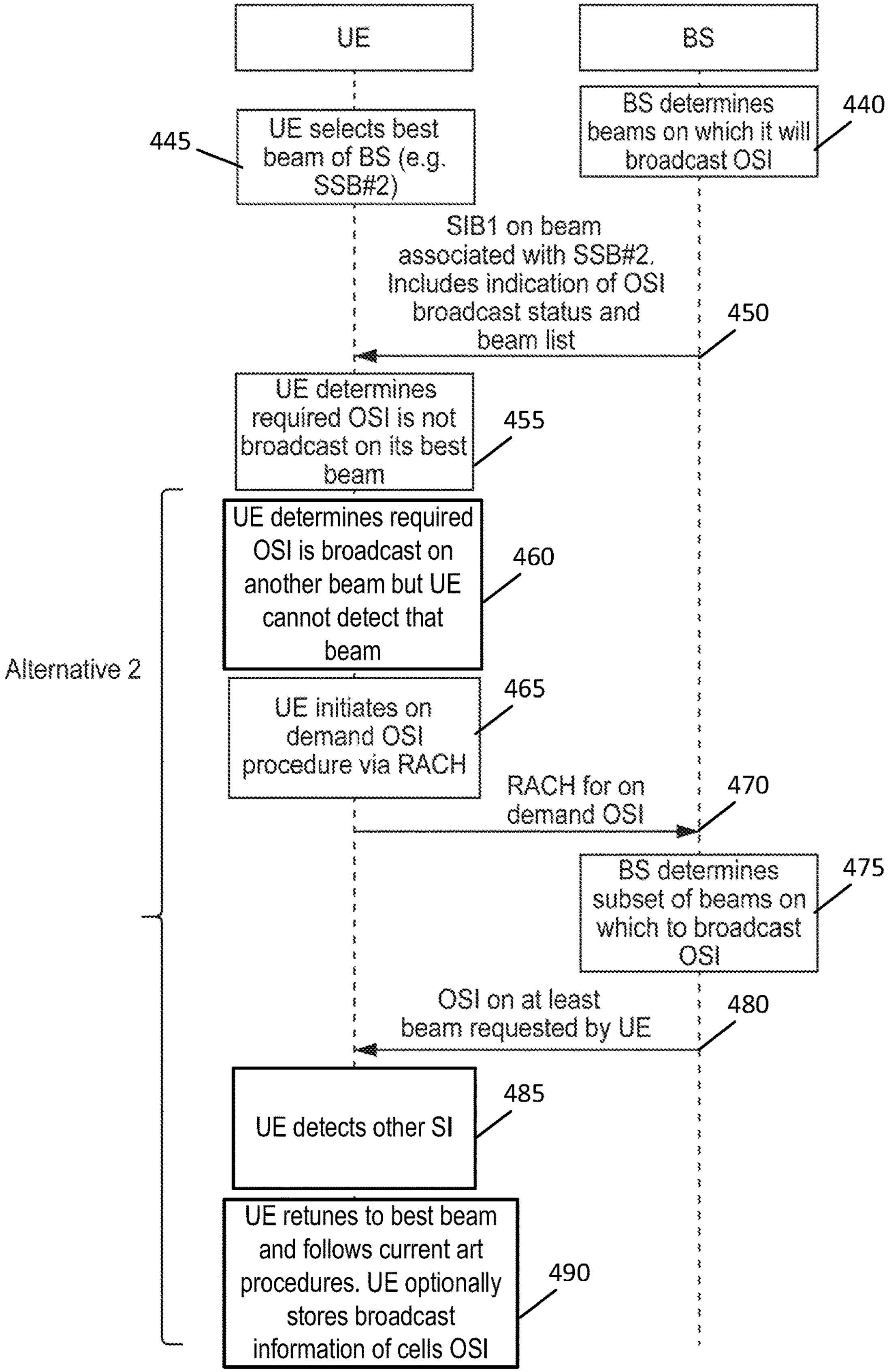

FIG. 4(*a*) illustrates an example signal diagram between the UE and the BS, according to certain example embodiments. As illustrated in FIG. 4(*a*), at 400, the BS may determine to broadcast the OSI in only a subset of its beams. In some example embodiments, the determination by the BS may be made based on, for example, the RACH load per SSB beam and/or the UE transactions per beam. At 410, the BS may also broadcast information on at least whether the OSI is broadcast on a specific beam. That is, the BS may transmit SIB1 on a beam associated with SSB #2 selected by the UE, and the transmission may also include an indication of an OSI broadcast status and beam list. As discussed above, in some example embodiments, the information may be transmitted via an information element in SIB1, via a MAC-CE transmitted jointly with SIB1, or via DCI employed to schedule the SIB1. In other example embodiments, the information may at least encompass whether OSI is transmitted in the beam via which the SIB1 information is received. The granularity of the transmitted OSI information may be 1 bit via which the value indicates whether any or no OSI is transmitted in the beam. In other example embodiments, at the cost of additional overhead, the BS may inform the UE of which OSI are transmitted in this beam, and which OSI are configured for on-demand and/or which other beams are transmitting OSI.

As further illustrated in FIG. 4(*a*), at 405, the UE may select a certain beam of a cell to camp on. For instance, the UE may select the best beam of the BS (e.g., SSB #2). Upon acquiring the SIB1 and information associated with the transmission status of the OSI, the UE may determine how to acquire the OSI. At 415, if the BS indication is that OSI is not transmitted in the UE's current beam, the UE may attempt to acquire the indication to determine if OSI is transmitted on other beams. At 420, the UE may determine that the required OSI is not transmitted on the selected best beam, but rather on another beam. Additionally, in some example embodiments, the UE may select an alternate beam that the UE can decode from the serving cell, and proceed to acquire the OSI. At 425, the BS may transmit the OSI to the UE on the other beam. After acquiring the OSI, the UE may at 430, decode the other SI. At 435, the UE may retune to its originally elected beam for the cell, and the UE may store information regarding which beams transmit OSI for the current cell.

FIG. 4(*b*) illustrates an example of another signal diagram between the UE and the BS, according to certain example embodiments. As illustrated in FIG. 4(*b*), operations 440, 445, 450, and 455 are similar to operations 400, 405, 410, and 415. Thus, the description of operations 440, 445, 450, and 455 may be similar to that of operations 400, 405, 410, and 415 presented above.

According to certain example embodiments, at 460, the UE may determine that there is no other alternate beam that the UE can decode from the serving cell, and that the required OSI is transmitted another beam that the UE cannot decode. Once the UE determines that the required OSI is transmitted on another beam that the UE cannot decode, the UE may at 465, initiate an on-demand OSI procedure via RACH. For instance, the UE may initiate/transmit a request to the BS for on-demand OSI. After the on-demand OSI procedure has been initiated, the UE may at 470, establish RACH with the BS for the on-demand OSI. Upon receiving the on-demand request from the UE, the BS may at 475, determine a subset of beams on which to transmit the OSI. According to some example embodiments, the subset of beams may at least include the beam for which the request was received but may include other beams as well. Thus, at 480, the BS may transmit the OSI to the UE on at least the beam requested by the UE.

In certain example embodiments, the subset may have beams for which periodic broadcasts are performed of the OSI such as, for example, when the time between these broadcasts is long. After acquiring the OSI, the UE may at 485, decode other SI. Additionally, at 490, the UE may retune to the best beam selected by the UE, and may store broadcast information regarding which beams transmit OSI for the current cell.

Figure 5:
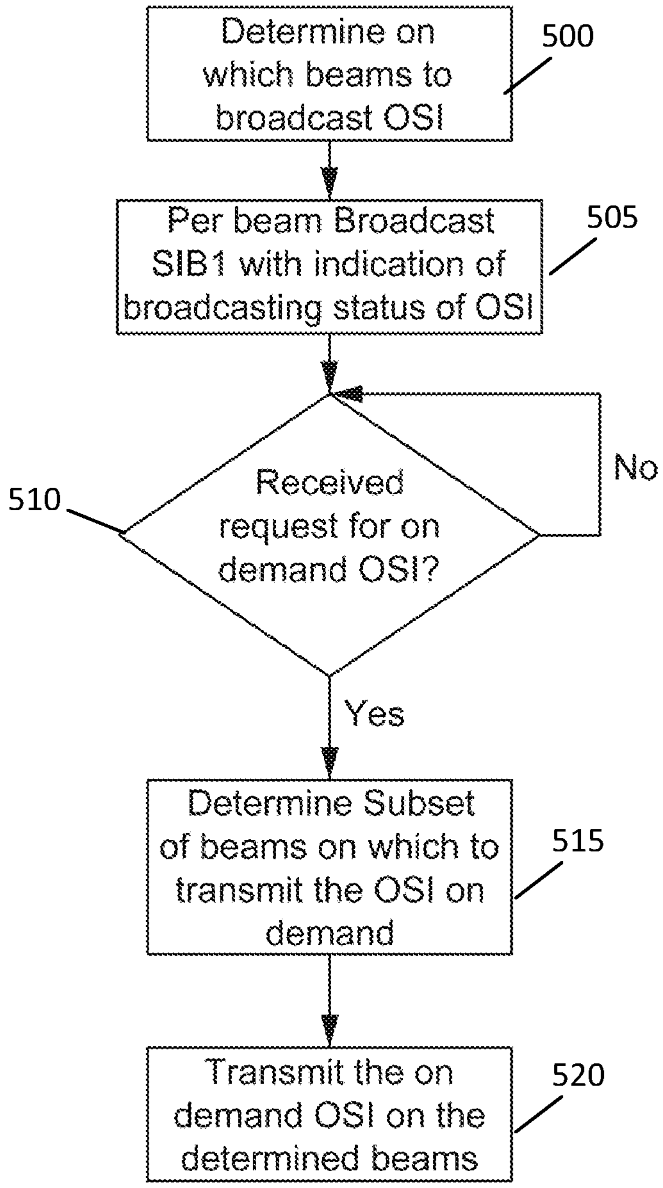
FIG. 5 illustrates an example operational flow diagram of the BS, according to certain example embodiments.

FIG. 5 illustrates an example operational flow diagram of the BS, according to certain example embodiments. As illustrated in FIG. 5, some of the operations shown therein may be similar to those of FIGS. 4(*a*) and 4(*b*). For instance, at 500, the BS may determine which beams to transmit the OSI. At 505, the BS may broadcast information on at least whether the OSI is broadcast on a specific beam. For example, the BS may transmit SIB1 on a beam associated with a particular SSB, and the transmission may also include an indication of an OSI broadcast status and beam list.

At 510, the BS may determine whether it has received a request for on-demand OSI from the UE. Once the BS has received the request, at 515, the BS may determine a subset of beams on which to transmit the OSI on demand. At 520, the BS may transmit the on-demand OSI on the determined beams to the UE.

Figure 6:
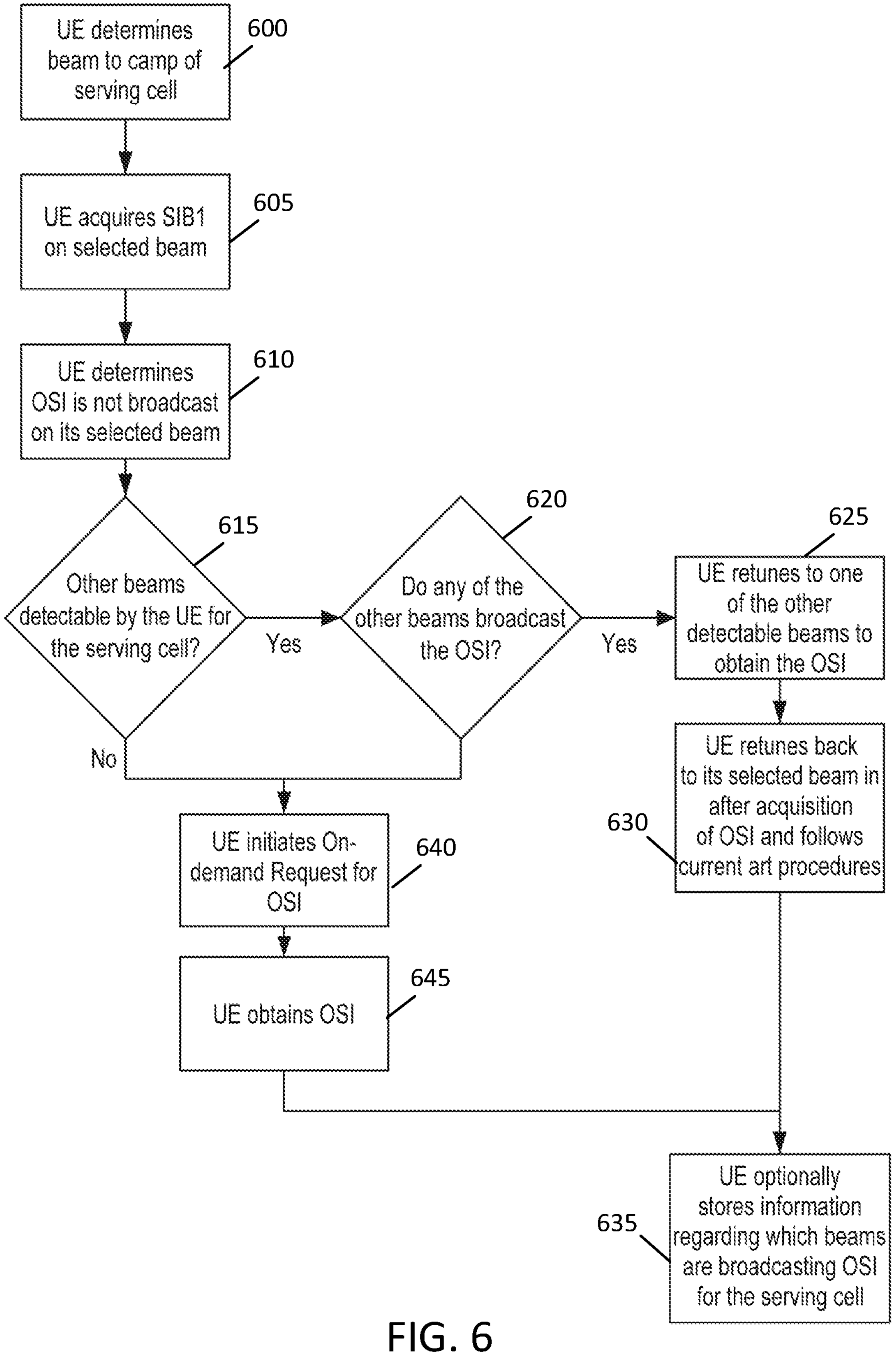
FIG. 6 illustrates an example operational flow diagram of the UE, according to certain example embodiments.

FIG. 6 illustrates an example operational flow diagram of the UE, according to certain example embodiments. As illustrated in FIG. 6, some of the operations shown therein may be similar to those of FIGS. 4(*a*) and 4(*b*). For instance, at 600, the UE may determine a beam to camp on the serving cell. At 605, the UE may acquire SIB1 on the beam selected by the UE. At 610, the UE may determine that OSI is not transmitted on the beam selected by the UE. At 615, the UE may determine whether beams other than the beam selected by the UE are detectable by the UE for the serving cell. If yes, at 620, the UE may determine whether any of the other beams broadcast the OSI. If yes, at 625, the UE may retune to one of the other detectable beams to obtain the OSI. Additionally, at 630, the UE may retune back to its selected beam at operation 600 after acquisition of the OSI. At 635, the UE may store information regarding which beams are broadcasting OSI for the serving cell.

If at 615 the UE determines that there are no other beams detectable by the UE for the serving cell, the UE may at 640, initiate an on-demand request for the OSI, and transmit such request to the BS. At 645, the UE may receive the requested OSI from the BS. Note that if the UE determined the need for the on-demand OSI via 620, the UE could initiate the on demand request for OSI on a beam which is in a subset of beams indicated by the network, and which may not be the UEs best beam. Once the UE has obtained the OSI from the BS, the UE may at 635, store information regarding which beams are broadcasting OSI for the serving cell.

Figure 7:
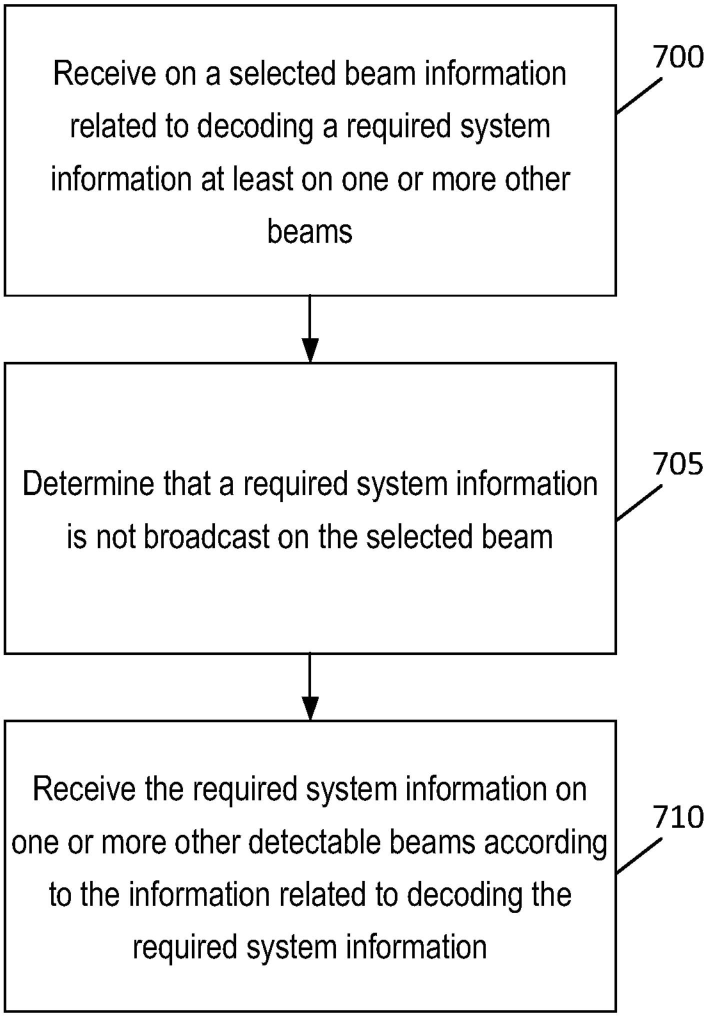
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a UE similar to one of apparatuses 10 or 20 illustrated in FIG. 9.

According to certain example embodiments, the method of FIG. 7 may include, at 700, receiving on a selected beam information related to decoding a required system information at least on one or more other beams. The method may also include, at 705, determining that a required system information is not broadcast on the selected beam. The method may further include, at 710, receiving the required system information on one or more other detectable beams according to the information related to decoding the required system information.

In certain example embodiments, the method may further include retuning to the selected beam after acquiring the required system information. In some example embodiments, the method may also include storing information regarding beams that broadcast the required system information for the serving cell. In other example embodiments, the information related to decoding the one or more other beams may be received via at least one of information element in the required system information, a medium access control-control element received together with the required system information, or a downlink control information employed to schedule the required system information.

According to certain example embodiments, the information related to decoding the one or more other beams may include the status of at least one system information or a subset beam list. According to some example embodiments, the status of the at least one system information may include whether the at least one system information is broadcasted in the selected beam via which the system information is received, or whether the at least one system information is broadcasted in the at least one beam in the subset beam list. According to other example embodiments, the method may also include receiving the required system information according to the information related to decoding at least one of the one or more other beams. According to further example embodiments, the method may further include, when the at least one system information is not broadcasted in the selected beam via which the required system information is received, decoding the at least one system information on the at least one beam in the subset beam list, or when the at least one system information is broadcasted in the at least one beam in the subset beam list, decoding the at least one system information on the at least one beam in the subset beam list.

In certain example embodiments, the method may further include decoding the at least one system information on the on the at least one beam in the subset beam list. In some example embodiments, the method may also include, when the one or more other beams are detectable for a serving cell, retuning to one or more detectable beams to obtain the required system information. In other example embodiments, the method may further include, when the one or more other beams are not detectable for the serving cell, initiating to the serving cell an on-demand request for the required system information. In further example embodiments, the method may also include retuning to the selected beam after acquiring the required system information.

Figure 8:
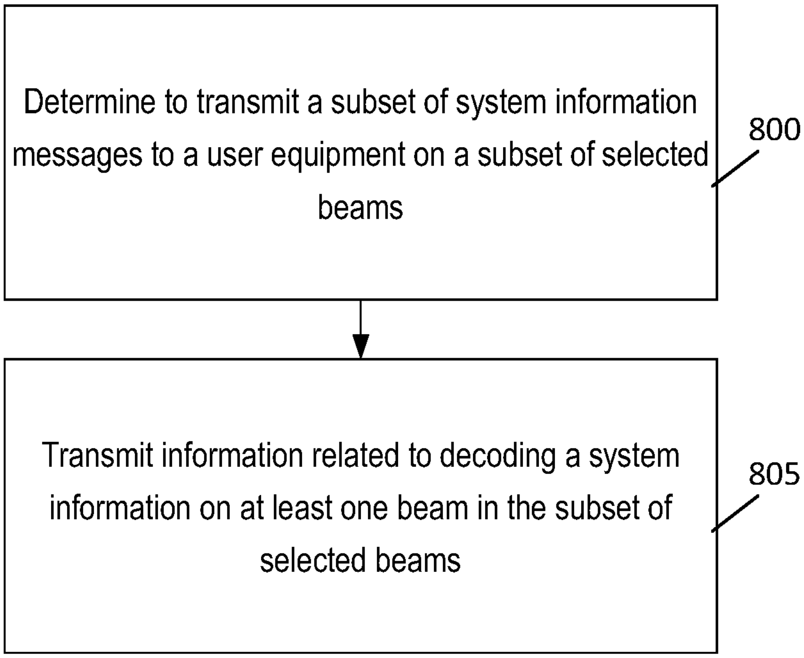
FIG. 8 illustrates an example flow diagram of another method, according to certain example embodiments.

FIG. 8 illustrates an example of a flow diagram of another method, according to certain example embodiments. In an example embodiment, the method of FIG. 8 may be performed by a network entity, or a group of multiple network elements in a 3GPP system, such as LTE or 5G-NR. For instance, in an example embodiment, the method of FIG. 8 may be performed by a network, cell, gNB, a source gNB, or any other device similar to one of apparatuses 10 or 20 illustrated in FIG. 9.

According to certain example embodiments, the method of FIG. 8 may include, at 800, determining to transmit a subset of system information messages to a user equipment on a subset of selected beams. The method may also include, at 805, transmitting information related to decoding a system information on at least one beam in the subset of selected beams.

According to certain example embodiments, the information related to decoding at least one of the other beams in the subset of selected beams may include a status of at least one system information or a subset beam list. According to some example embodiments, the status of the at least one system information may include whether the at least one system information is broadcasted in one or a subset of beams. According to some example embodiments, the determination to transmit the subset of system information messages may be based on random access channel load per beam, or user equipment transactions per beam. According to other example embodiments, the determination to transmit the subset of system information messages may be dynamic depending on a time of day.

In certain example embodiments, the information related to decoding at least one of the other beams in the subset of selected beams may be transmitted via at least one of an information element in a required system information, a medium access control-control element received together with the required system information, or a downlink control information employed to schedule the required system information. In some example embodiments, the method may also include updating the subset of selected beams by including at least a beam in which there was an initiation to a serving cell an on-demand request for the required system information.

Figure 9:
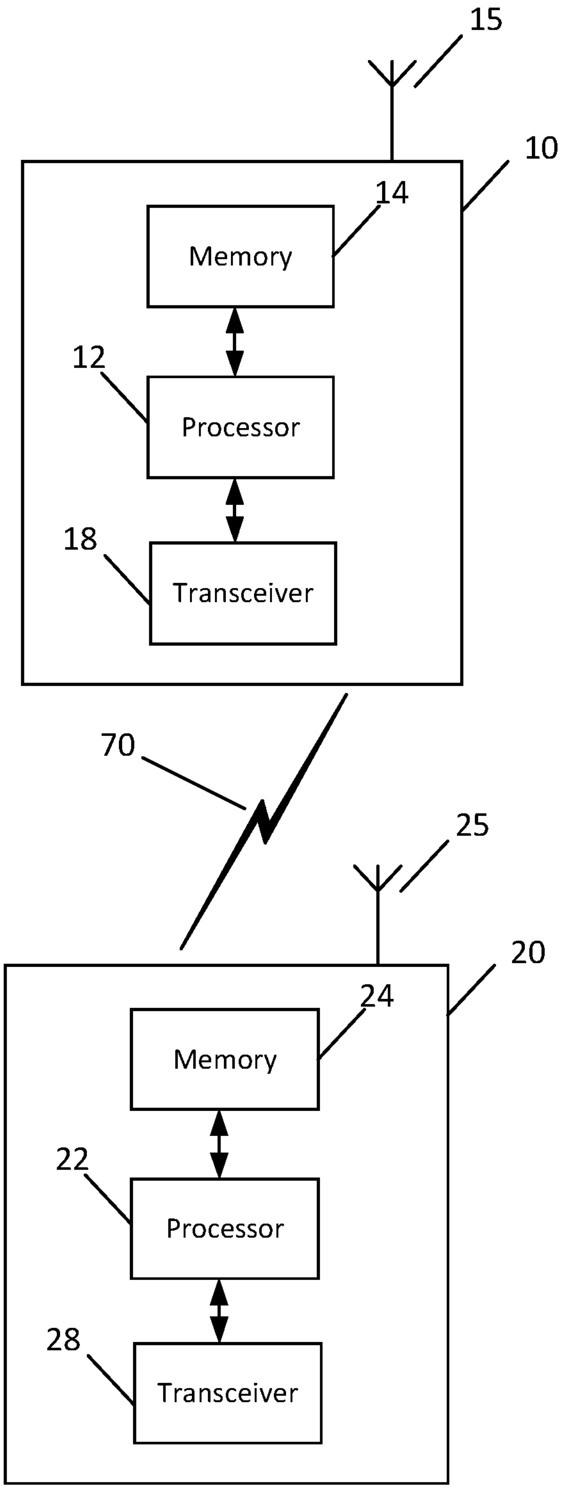
FIG. 9 illustrates a set of apparatuses, according to certain example embodiments.

FIG. 9 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 9.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9.

As illustrated in the example of FIG. 9, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes and examples illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-8.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive on a selected beam information related to decoding a required system information at least on one or more other beams. Apparatus 10 may also be controlled by memory 14 and processor 12 to determine that a required system information is not broadcast on the selected beam. Apparatus 10 may further be controlled by memory 14 and processor 12 to receive the required system information on one or more other detectable beams according to the information related to decoding the required system information.

As illustrated in the example of FIG. 9, apparatus 20 may be a network, core network element, or element in a communications network or associated with such a network, such as a gNB, BS, cell, or NW. It should be noted that one of ordinary skill in the art would understand that apparatus 20 may include components or features not shown in FIG. 9.

As illustrated in the example of FIG. 9, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to determine to transmit a subset of system information messages to a user equipment on a subset of selected beams. Apparatus 20 may also be controlled by memory 24 and processor 22 to transmit information related to decoding a system information on at least one beam in the subset of selected beams.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving on a selected beam information related to decoding a required system information at least on one or more other beams. The apparatus may also include means for determining that a required system information is not broadcast on the selected beam. The apparatus may further include means for receiving the required system information on one or more other detectable beams according to the information related to decoding the required system information.

Certain example embodiments may also be directed to an apparatus that includes means for determining to transmit a subset of system information messages to a user equipment on a subset of selected beams. The apparatus may also include means for transmitting information related to decoding a system information on at least one beam in the subset of selected beams.

Certain example embodiments described herein provide several technical improvements, enhancements, and/or advantages. For instance, in some example embodiments, it may be possible to achieve NW energy savings at any cell load (i.e., not limited to low load scenarios). In other example embodiments, it may be possible to optimize the transmission of OSIs by consolidating/limiting the transmission on one or multiple overlapping beams, rather than broadcasting/on-demand transmission on all beams. Furthermore, in beams where UE presence is infrequent, it may be possible to save transmissions. Additionally, in analog beamforming systems, certain example embodiments may also provide a significant benefit in spectral efficiency.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
5GS 5G System
BS Base Station
eNB Enhanced Node B
E-UTRAN Evolved UTRAN
gNB 5G or Next Generation NodeB
LTE Long Term Evolution
NR New Radio
NW Network
OSI Other System Information
PDCCH Physical Downlink Control Channel
RACH Random Access Channel Procedure
SI System Information
SIB System Information Block
SSB Synchronization Signal Block
UE User Equipment
UL Uplink

We claim:

1. An apparatus, comprising:

at least one processor; and at least one memory comprising computer program code, the at least one memory and the computer program code configured to, with storing instructions that, when executed by the at least one processor, cause the apparatus at least to:

receive, on a selected beam, information related to decoding a required system information at least on one or more other beams;

determine that the required system information is not broadcast on the selected beam; and receive, when the required system information is not broadcast on the selected beam, the required system information on one or more other detectable beams according to the information related to decoding the required system information.

2. The apparatus according to claim 1, wherein the at least one memory and the computer program code are further configured to, with storing instructions that, when executed by the at least one processor, cause the apparatus at least to:

determine whether one or more other beams are detectable for a serving cell;

when the one or more other beams are detectable for the serving cell and the required system information is broadcasted on the one or more other beams, return to the one or more detectable beams to obtain the required system information; and when the one or more other beams are not detectable for the serving cell or the required system information is not broadcasted in any of the one or more other beams, initiate to the serving cell an on-demand request for the required system information.

3. The apparatus according to claim 1, wherein the at least one memory and the computer program code are further configured to, with storing instructions that, when executed by the at least one processor, cause the apparatus at least to:

return to the selected beam after acquiring the required system information.

4. The apparatus according to claim 1, wherein the at least one memory and the computer program code are further configured to, with storing instructions that, when executed by the at least one processor, cause the apparatus at least to:

store information regarding beams broadcasting configuration of the required system information for the serving cell.

5. The apparatus according to claim 1, wherein the information related to decoding the required system information at least on the one or more other beams is received via at least one of the following:

an information element in a system information, a medium access control-control element received together with the system information, or a downlink control information employed to schedule the system information.

6. The apparatus according to claim 1, wherein the information related to decoding the required system information at least on the one or more other beams comprises a status of at least one system information or a subset beam list.

7. The apparatus according to claim 6, wherein the status of the at least one system information comprises:

whether the at least one system information is broadcasted in the selected beam via which the system information is received, or whether the at least one system information is broadcasted in the at least one beam in the subset beam list.

8. The apparatus according to claim 6, wherein the at least one memory and the computer program code are further configured to, with storing instructions that, when executed by the at least one processor, cause the apparatus at least to:

receive the required system information according to the information related to decoding the required system information on at least one of the one or more other beams; and when the at least one system information is not broadcasted in the selected beam via which the required system information is received, decode the at least one system information on the at least one beam in the subset beam list; or when the at least one system information is broadcasted in the at least one beam in the subset beam list, decode the at least one system information on the at least one beam in the subset beam list.

9. The apparatus according to claim 6, wherein the at least one memory and the computer program code are further configured to, with storing instructions that, when executed by the at least one processor, cause the apparatus at least to:

decode the at least one system information on the on the at least one beam in the subset beam list;

when the one or more other beams are detectable for a serving cell, return to one or more detectable beams to obtain the required system information;

when the one or more other beams are not detectable for the serving cell, initiate to the serving cell an on-demand request for the required system information; and return to the selected beam after acquiring the required system information.

10. An apparatus, comprising:

at least one processor; and at least one memory comprising computer program code, the at least one memory and the computer program code configured to, with storing instructions that, when executed by the at least one processor, cause the apparatus at least to:

determine to transmit a subset of system information messages to a user equipment on a subset of beams; and transmit information related to decoding the subset of system information messages on at least one other beam in the subset of beams, wherein the information related to decoding a system information on at least one selected beam in the subset of beams comprises a broadcast configuration status of at least one system information or a subset beam list, and wherein the broadcast configuration status of the at least one system information comprises whether the at least one system information can be requested on demand in at least one beam in the subset beam list.

11. The apparatus according to claim 10, wherein the determination to transmit the subset of system information messages is based on random access channel load per beam, or user equipment transactions per beam.

12. The apparatus according to claim 10, wherein the determination to transmit the subset of system information messages is dynamic depending on a time of day.

13. The apparatus according to claim 10, wherein the information related to decoding the system information on at least one other beam in the subset of beams is transmitted via at least one of the following:

an information element in a system information, a medium access control-control element received together with the system information, or a downlink control information employed to schedule the system information.

14. The apparatus according to claim 10, wherein the at least one memory and the computer program code are further configured to, with storing instructions that, when executed by the at least one processor, cause the apparatus at least to:

update the subset of beams by including at least a beam in which there was an initiation to a serving cell an on-demand request for the required system information.

15. A method, comprising:

receiving, on a selected beam, information related to decoding a required system information at least on one or more other beams;

determining that the required system information is not broadcast on the selected beam; and receiving, when the required system information is not broadcast on the selected beam, the required system information on one or more other detectable beams according to the information related to decoding the required system information.

16. The method according to claim 15, further comprising:

determining whether one or more other beams are detectable for a serving cell;

when the one or more other beams are detectable for the serving cell and the required system information is broadcasted on the one or more other beams, returning to one or more detectable beams to obtain the required system information; and when the one or more other beams are not detectable for the serving cell or the required system information is not broadcasted in any of the one or more other beams, initiating to the serving cell an on-demand request for the required system information.

17. The method according to claim 15, further comprising:

returning to the selected beam after acquiring the required system information.

18. The method according to claim 15, further comprising:

storing information regarding beams broadcasting configuration of the required system information for the serving cell.

* * * * *